Figure 1:
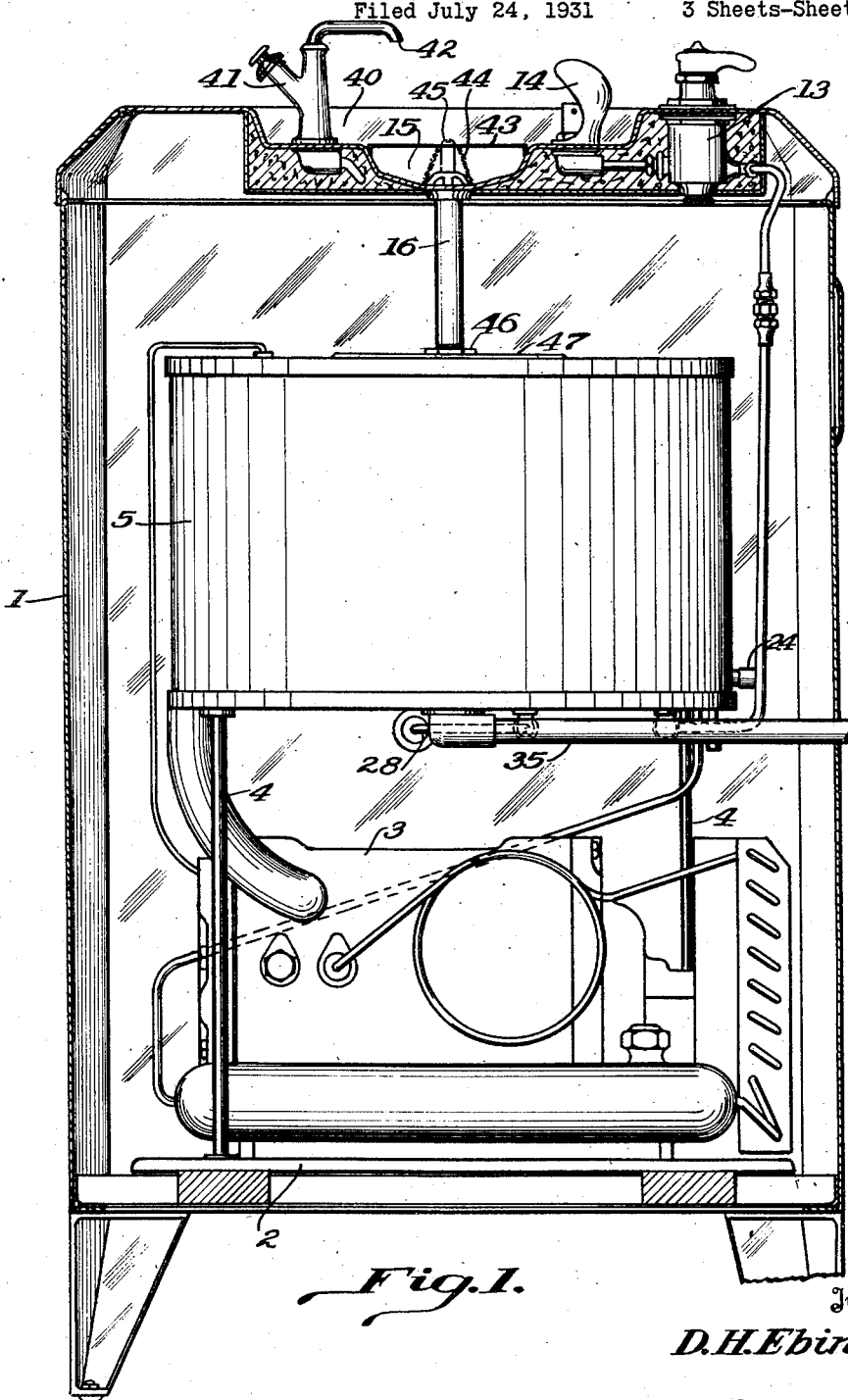

June 6, 1933. D. H. EBINGER 1,912,572
LIQUID COOLING APPARATUS
Filed July 24, 1931  3 Sheets-Sheet 1

Inventor
D.H.Ebinger
By W. S. McDowell
Attorney

June 6, 1933.    D. H. EBINGER    1,912,572
LIQUID COOLING APPARATUS
Filed July 24, 1931    3 Sheets-Sheet 3

Inventor
D. H. Ebinger
By W. S. McDowell
Attorney

Patented June 6, 1933

1,912,572

UNITED STATES PATENT OFFICE

DAVID H. EBINGER, OF COLUMBUS, OHIO, ASSIGNOR TO THE D. A. EBINGER SANITARY MFG. COMPANY, OF COLUMBUS, OHIO, A CORPORATION OF OHIO

LIQUID COOLING APPARATUS

Application filed July 24, 1931. Serial No. 552,638.

This invention relates broadly to improvements in the art of refrigeration and has particular reference to refrigerating apparatus adapted for the cooling of drinking water and wherein a mechanical system of refrigeration is utilized for the purpose of cooling the water circulating through the system to a desired temperature.

It is a primary object of the present invention to provide in a cooler or refrigerator of this class a heat exchanger in the form of a pre-cooler through which the drinking water is initially circulated prior to passing through the final cooling coils of the apparatus, the construction of the pre-cooler being such that the cold waste water, which drains from the receptor or basin of the refrigerator, is circulated through the pre-cooler prior to being discharged from the refrigerator, the circulation of this waste water through the pre-cooler being so carried out that the waste water may be used to extract heat from the incoming drinking water, thereby lowering the temperature of the drinking water so that less operation and expenditure of power on the part of the final cooling apparatus will be necessary than is now used in apparatus of this kind.

Another object of the invention resides in a pre-cooler for the purpose specified which consists of a casing having insulated walls and wherein the casing is provided with a helical coil through which the drinking water is circulated, said coil being vertically arranged within the casing and positioned in close proximity to an inner wall of the casing and the wall of a cylindrical core positioned within the coil to provide a passage for the circulation of the chilled or cold waste water, which water will gravitate over the several loops forming the coil and into a waste outlet, the coil being formed from a heat conducting material such as copper in order to permit of efficient heat transfer between the cold waste water and the warmer drinking water.

A further object of the invention is to provide an insulated casing with an additional chamber concentrically arranged with respect to the chamber containing the pre-cooling coil and in which chamber a refrigerating coil and a main water cooling coil is arranged connected with the refrigerating apparatus and the water main respectively. Connections are provided between the waste conduit and the outer chamber for directing part of said waste water into the outer chamber wherein the refrigerating coil and the main water cooling coil is located so as to maintain the water level therein automatically at a point above said coils.

With these and other objects in view, which will appear as the description proceeds, the invention consists in the novel features of construction, combinations of elements and arrangement of parts hereinafter to be more fully described and pointed out in the appended claims.

Figure 2:
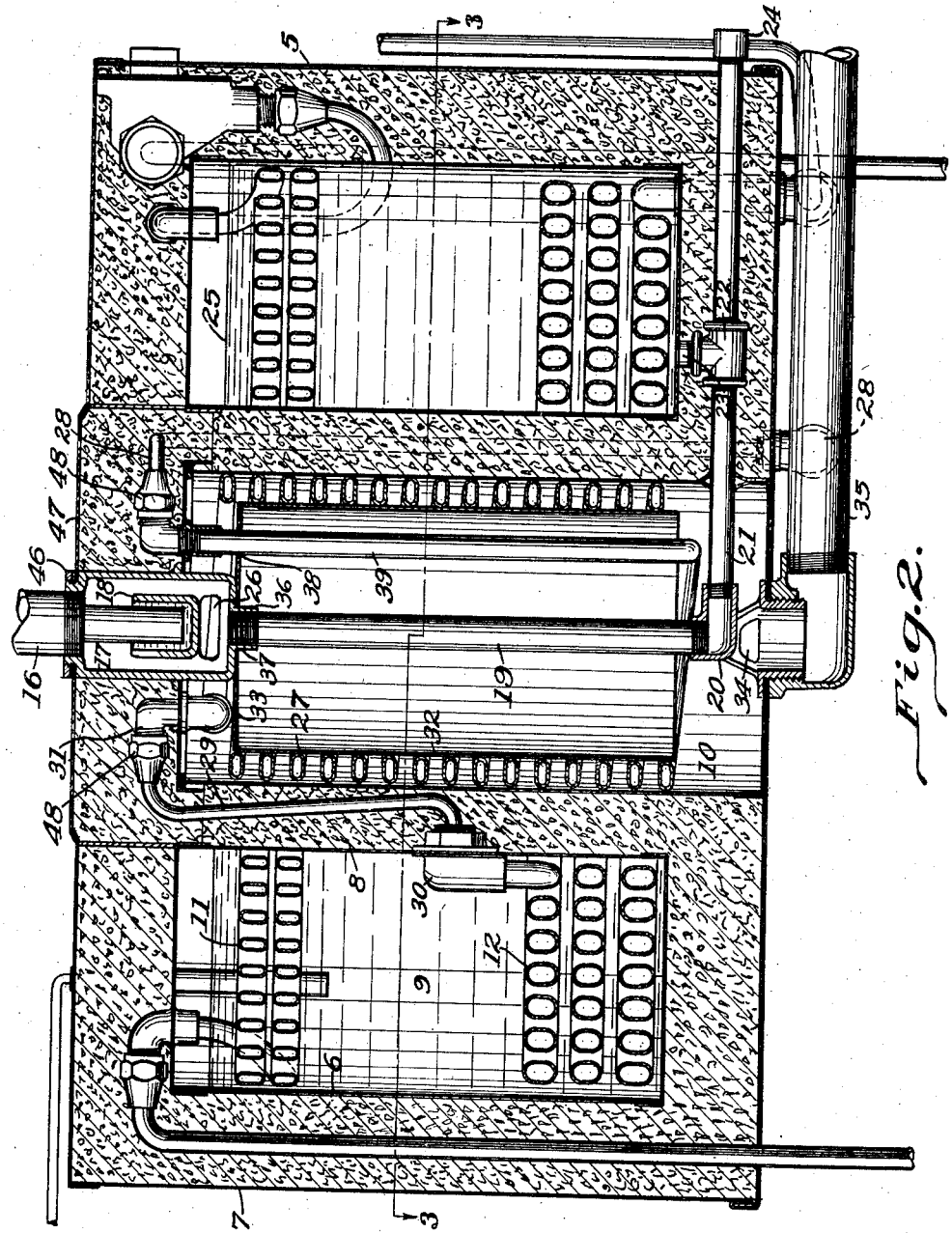
Figure 3:
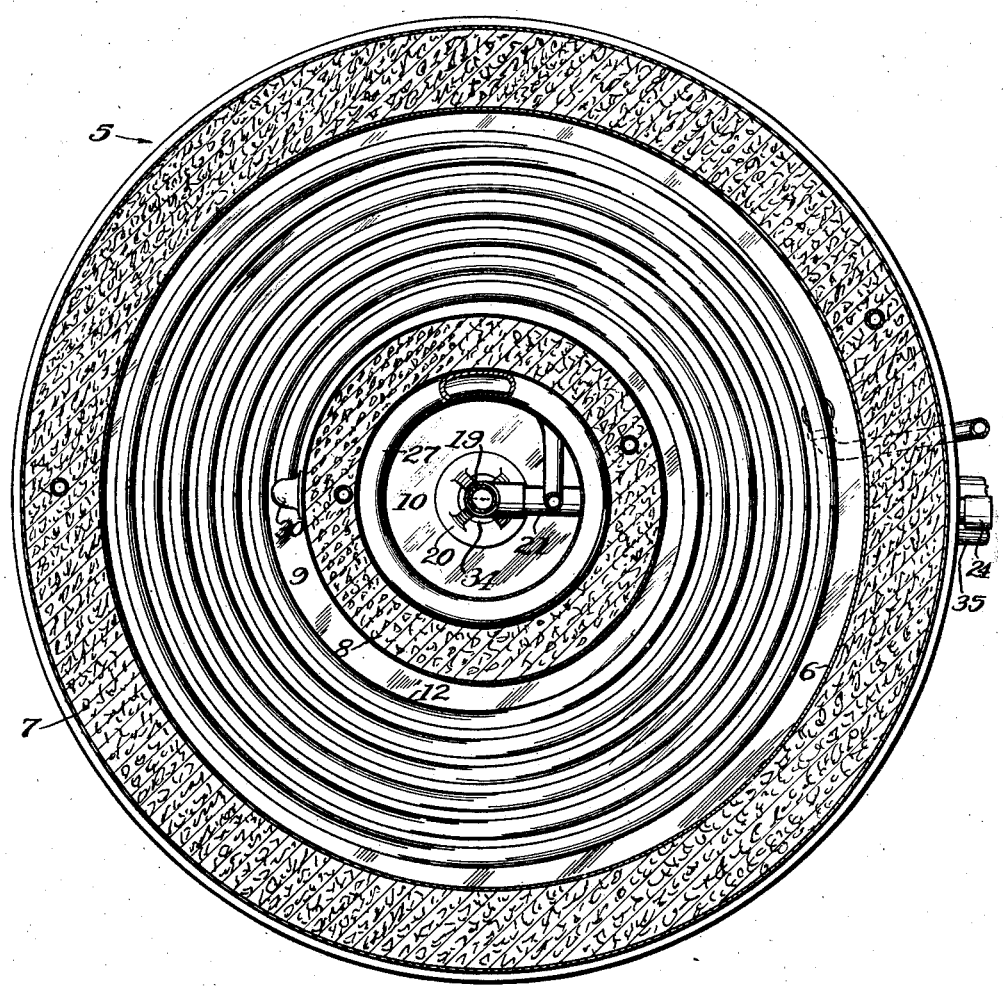

In the accompanying drawings:

Figure 1 is a vertical sectional view taken through the refrigerating apparatus comprising the present invention, Figure 2 is an enlarged vertical sectional view taken through the cooling coil housing of the apparatus, Figure 3 is a horizontal sectional view taken on the line 3—3 of Figure 2.

Referring more particularly to the drawings, the numeral 1 designates the outer casing of a mechanical refrigerated drinking fountain or water dispenser. This casing is generally of cubical or box-like form in the specific adaptation of the invention selected for illustration, although insofar as the casing 1 is concerned the same may assume any shape or appearance. In this instance, however, the casing is formed to include a base portion 2 on which is positioned the usual electrically motor driven compressor unit 3 of any suitable type commonly found in connection with mechanical refrigerating apparatus. Supported above the compressor unit by means of vertical posts 4 is a double-walled coil housing 5 of cylindrical form comprising the inner and outer metallic walls 6 and 7 between which is confined insulation in the form of corkboard or the like adapted for the purpose of minimizing heat transfer between the interior of the housing and the atmosphere. Formed concentrically with the outer wall 7 and spaced therefrom is an inner cylindrical wall 8 dividing the housing 5 into outer and inner chambers 9 and 10. The outer chamber is adapted to receive an expansion coil 11 of the mechanical refrigerating apparatus and the main water cooling coil 12. The coil 11 is employed for cooling the liquid within the chamber 9 which liquid may be water, brine or the like. The coil 12 located at the bottom of the chamber 9 and below the coil 11 is immersed in the liquid so that the drinking water, which is circulated through the coil 12 in any suitable manner, may have its temperature suitably lowered prior to the discharge of the water by way of the bubbler valve 13 arranged exteriorly of the casing 1.

Arranged in the top of the casing 1 and adjacent the drinking bubbler 14, having a connection with the valve 13, is a receptor or basin 15 which is adapted to receive the waste water which is inevitably present in the operation of drinking fountains of this character. The receptor or basin 15 includes a drain pipe 16 which is led to the housing 5 and connected at its lower end with the casing of a seal trap 17. Formed within this casing is a trough or cup 18 into which the lower end of the drain pipe 16 extends and which is adapted to receive the waste water draining through the pipe 16. The trough with the water therein forms a seal and prevents the warmer atmospheric air from entering the interior of the cooler. The waste water within the trough will flow over the upper edges thereof and downwardly into a stand pipe 19 connected at its upper end to the lower end of the seal trap casing 17 and at its lower end to a fitting 20 located at the bottom of the chamber 10. Communicating with the stand pipe 19 through the fitting 20 is a horizontally arranged pipe line 21 in which is positioned a pipe T 22 having a connection with the interior of the chamber 9 by means of a short pipe nipple 23. The outer end of the pipe line 21 is closed by a cap 24 which may be removed from time to time in order to drain the chamber 9 for cleaning or other purposes. The waste water flowing through the pipes 19, 21 and 23 into the chamber 9 may thus be utilized to fill the chamber 9 and after reaching the level indicated at 25 will be even with the outlet ports 26 formed in the side walls of the seal trap casing 17. Any waste water which rises above this level will flow through the ports 26 and into the chamber 10 wherein the pre-cooling coil or heat exchanger 27 is located and to which the present invention is particularly directed. The waste water is adapted to contact with this heat exchanger or coil in order that the temperature of the drinking water may be lowered prior to its circulation through the coil 12 and to permit this without expenditure of additional mechanical effort.

To permit of this economy in the operation of coolers of this character the heat exchanger or coil 27, shown in Figures 2 and 3, is vertically arranged within the chamber 10 and has one end connected to a pipe line 28 leading to a water main or other supply (not shown). The other or upper end of the coil 27 is connected with the main or final water cooling coil 12 by means of a pipe section 29 which is connected to the coils 27 and 12 respectively, by means of suitable connections 30 and 31. The coil 27, which is positioned in close proximity to the cylindrical wall of the chamber 10, has positioned therein a core 32 which is in the shape of an inverted shell having its upper end wall 33 slightly inclined towards the coils comprising the heat exchanger 27. The cylindrical wall of the core 32 is also in close proximity to the coil so as to provide restricted passages between the walls of the chamber 10 and the walls of the coil 32. This will cause the waste water issuing from the ports 26 to take a tortuous path and trickle from one coil to the other, collecting in the bottom of the chamber 10 wherein it finds its outlet through openings 34 formed in the fitting 20, into the waste line 35 and exterior of the cabinet 1 to a suitable point of disposal. It will be seen by this construction that the waste water is permitted to circulate over the coil 27 and that the latter is of sufficient length to permit a large volume of drinking water to be cooled and remains within the coil for an ample interval of time to secure efficient heat exchange between said waste and drinking water.

By the use of the heat exchanger or coil 27 the temperature of the drinking water will be materially lowered prior to the time when the drinking water is submitted to the action of the mechanically operated refrigerating apparatus, this being accomplished by extracting a portion of the heat from the drinking water by the use of the cold waste water which heretofore has been allowed to escape without performing any useful function. By thus pre-cooling the drinking water the operation of the refrigerating mechanism is correspondingly lightened and an economy of appreciable proportions thereby secured.

The pre-cooling coil 27, which is usually formed from copper tubing, is somewhat flattened horizontally in order to provide for the greatest length of tubing within the height of the chamber 10 and to present a broader contact surface to the waste water and to also retard the waste water in its flow downwardly from one loop of the coil to the other. Due to the small clearance between the inner wall of the chamber 10, the coil 27 and the cylindrical wall of the core 32, the waste water will be held for a considerable time period between the loops forming the coil before freeing itself and passing out through the waste line or drain 35. The core 32, which is preferably of a rust-proof sheet metal construction although the same may be formed from wood or other material, is made open at its lower end and supported in place within the coil 27 by its engagement with the lowermost loop thereof and held in proper spaced relation centrally within the coil by means of the threaded boss 36 of the shell trap casing 17 and connecting the upper end of the water stand pipe 19, which boss extends through an opening 37 formed centrally in the wall 33 of the core. An opening 38 is also formed in the wall 33 for the reception of the vertically arranged tube section 39 of the coil 27 connected with the drinking water supply line 28. The position of the tube section 39 within the opening 38 will also tend to hold the core in parallel relationship with the inner surface of the coil 27.

The upper end of the cabinet may be finished in any suitable manner and the top wall thereof forming the basin 15 may also be provided with a depression 40 wherein besides the bubbler 14 a valved glass filler 41 is provided which has its inlet end connected at any suitable point between the discharge controlled valve 13 and the outlet side of the main cooling coil 12. The outlet end 42 of the glass filler as well as the bubbler 14 is positioned so that the waste water therefrom will flow into the basin 15. The upper open end of the basin 15 may be covered by a perforated plate 43 and a screen 44 may be provided between the plate 43 and the bottom of the basin 15 in order to arrest any particles of foreign matter contained within the water before the same enters the cooler. The screen may be removed from time to time for cleaning purposes by removing the fastening element 45 for holding the plate 43 in place. The precooling coil may also be removed from time to time for cleaning by unscrewing the clamping nut 46 permitting the plate 47 to be lifted off giving access to the pipe connections 48 after first removing the loose packing material surrounding the same. By disconnecting the pipes at this point and unthreading the seal trap casing 17 from its connection with the stand pipe 19, the coil 27 and the shell 32 may be lifted free from the unit.

In view of the foregoing it will be seen that the present invention provides a simple, inexpensive and positively operating heat exchanger or pre-cooler by means of which economy in the operation of mechanical refrigerating apparatus is secured. The heat exchanger involves few and simple parts, and after installation requires practically no attention to maintain the same in an efficient operating condition. With the exception of the slight servicing in the removal of the strainer or screen provided within the receptor basin, no further service of the cooler is required. It will be understood, of course, that various changes may be made in the construction of the cooler and the arrangement of various parts, and I therefore do not limit myself to the precise details of construction herein specifically illustrated and described, but reserve the right to employ such modifications or mechanical variations as may be said to fall fairly within the scope and intent of the following claims.

What is claimed is:

1. In refrigerating apparatus, a housing formed to include walls of insulating material and provided with a centrally disposed chamber, a second chamber within said housing arranged concentrically with respect to the first named chamber, a pre-cooling coil in said centrally disposed chamber, a final cooling coil arranged in the concentrically disposed chamber, a connection between the inlet side of said pre-cooling coil and a source of water supply, a connection between the outlet side of said pre-cooling coil and the final cooling coil, a receptor adapted to receive waste water from said final cooling coil, a drain conduit connecting the receptor and both of said chambers, and means provided in connection with said drain conduit for maintaining a certain liquid level within the outer of said chambers and for directing part of said waste water into contact with said pre-cooling coil.

2. In a refrigerated drinking fountain, a cylindrical housing having insulated walls and provided with a centrally disposed chamber, a second chamber within said housing concentrically arranged with respect to the first named chamber, a vertically arranged pre-cooling coil in said centrally disposed chamber, a final cooling coil arranged in the bottom of said second chamber, a refrigerant expansion coil above said final cooling coil and spaced from the latter, a connection between said pre-cooling coil and final cooling coil, a connection between said pre-cooling coil and a source of drinking water supply, a discharge valve in the outlet from said final cooling coil, a receptor for the waste water from said valve, a drain conduit from said receptor communicating with both of said chambers, and means formed in connection with said drain conduit for directing a portion of said waste water into the second chamber to maintain a liquid level therein above said final cooling and expansion coil and for also directing part of said waste water into contact with said pre-cooling coil.

3. In a refrigerated drinking fountain, a water cooler including a housing formed with insulated walls and having an outer and inner chamber, said chambers being concentrically arranged with respect to each other, a pre-cooling coil arranged within the inner of said chambers, a final cooling coil in the outer of said chambers, the inlet end of said pre-cooling coil being connected with a source of water supply, a connection between the discharge end of said pre-cooling coil and said final cooling coil, said outer chamber being adapted to receive a body of liquid to immerse said final cooling coil, a discharge valve for controlling the outlet of said main cooling coil, a waste water receptor for receiving the water from said valve, a drain conduit from said receptor having an outlet into each of said chambers whereby the waste water flowing through said outlets will maintain said liquid level within the outer chamber and circulate over said pre-cooling coil.

4. In a refrigerated drinking fountain, a cabinet, a cylindrical housing within said cabinet having walls composed of heat insulating material, an inner cylindrical wall within said housing dividing the latter into inner and outer chambers concentrically arranged with respect to each other, a pre-cooling coil within the inner of said chambers, a final cooling coil located in the outer of said chambers, a connection between the discharge end of said pre-cooling coil and said final cooling coil, a connection between the inlet end of said pre-cooling coil and a source of water supply, a valve located at the top of said cabinet and adapted to control the outlet from said final cooling coil, a receptor basin in the top of said cabinet and adapted to receive the waste water from said valve, a drain conduit from said receptor leading to said inner chamber, an outlet port in said drain conduit for directing a portion of said waste water into contact with said pre-cooling coil, and means for directing a portion of said waste water from said drain pipe into the outer of said chambers to maintain a liquid level therein above said final cooling coil.

5. In a refrigerator drinking fountain, a housing having insulated walls and provided with a pair of chambers, a pre-cooling coil in one of said chambers, a final water cooling coil arranged in the other of said chambers, a connection between the inlet side of said pre-cooling coil and a source of water supply, a connection between the outlet side of said pre-cooling coil and the final cooling coil, a receptor adapted to receive waste water from said final cooling coil, a drain conduit connecting the receptor and both of said chambers, and means provided in connection with said drain conduit for maintaining a certain liquid level within the chambers for the final cooling coil and for directing part of said waste water into contact with said pre-cooling coil.

6. In a refrigerator drinking fountain, a housing having a chamber therein, a vertically disposed water pre-cooling coil of helical form arranged within said chamber and lying adjacent the side wall thereof, the inlet side of said coil being connected with a source of drinking water supply, a core within said coil having its side wall in close proximity to the latter, a waste water receptor in connection with said fountain, a drain conduit leading therefrom, said drain conduit having its outlet terminating in said chamber whereby waste water therefrom will flow over said core and into contact with said pre-cooling coil, the space between said coil, the core, and the wall of said chamber being such as to provide a retarded flow of the water in its passage over said coil.

In testimony whereof I affix my signature.

DAVID H. EBINGER.